Aug. 10, 1943.        A. H. SHANGLE        2,326,572
HOLDER FOR ELECTRICALLY HEATED TOOLS
Filed July 1, 1942

INVENTOR
A. H. SHANGLE
BY J. MacDonald
ATTORNEY

Patented Aug. 10, 1943

2,326,572

UNITED STATES PATENT OFFICE 2,326,572

HOLDER FOR ELECTRICALLY HEATED TOOLS

Amos H. Shangle, Roselle, N. J., assignor to Bell Telephone Laboratories, Incorporated, New York, N. Y., a corporation of New York Application July 1, 1942, Serial No. 449,270

2 Claims. (Cl. 219—23)

This invention relates to holder devices used for receiving electrically heated tools such as soldering coppers and the like during so-called idling periods.

It is an improvement over the electric soldering copper holder disclosed in my Patent 2,174,230, issued September 26, 1939. In that holder two concentrically disposed perforated metallic shells are disposed in concentric relation to each other, the inner shell serving for receiving the soldering copper and the outer disposed shell serving as a guard around the inner shell which becomes heated as by conduction and radiation from the soldering copper. The temperature of the soldering copper, due to its idling condition, has been found to rise considerably above that maintained during soldering operations, with the consequent oxidation of the copper working surface and the necessity of retinning the latter, following each idling cycle. Furthermore, in actual practice it has been found impractical to deenergize the heater element during its idling period due to the lapse of time required for the soldering copper to reach a sufficiently high degree of temperature to effect soldering connections when reconnected to the current source.

The object of this invention is the provision of a soldering copper holder which will be simple in construction, efficient in operation and in which the copper is maintained uniformly at any of a number of desired temperatures during idling period.

In accordance with this invention, a mounting in the form of a plate is provided for pivotally supporting at one end a hollow metallic tubular member into which the copper is placed as during so-called idling periods, and heating means in the form of a resistance wire, coiled on a sleeve of insulating material, mounted on the tubular member, is connected to the lead-in wires of the soldering copper to serve when energized to maintain the latter at a temperature substantially that required for effecting soldering operations, which temperature is controlled by a manually operable switching mechanism in the form of a knob rotating a pinion for moving a gear rack and thereby a wiper member in engageable relation with contact points connected to the heating coil of the tubular heater member. Means in the form of contact elements carried by the mounting plate cooperates with a contact element carried by the tubular heater member to form a stop for limiting the pivotal movement of the latter under the tension of a spring serving to close such a contact to either connect or disconnect the heating element of the soldering copper from its direct energizing circuit as effected by the insertion or removal of the soldering copper from the tubular member as the case may be. The disconnecting of such circuit by the opening of the contact elements as when placing the soldering copper into the tubular member is effective to remove the shunt connection from the heater element of the tubular member to cause its maximum energization and thereby maintaining the soldering copper to any desired degree of temperature within the range of the manually adjustable switching mechanism.

Other novel features and advantages of the invention will appear from the following description and by the claims appended thereto, reference being had to the accompanying drawing, in which:

Figure 2:
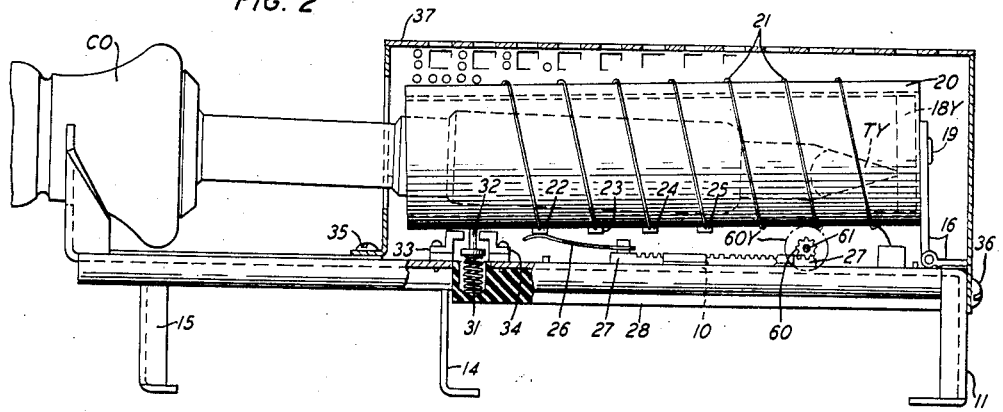
Fig. 2 is another side view shown with the soldering copper in position in the tubular member, the casing which serves as a guard around the tubular member being shown in vertical section.

In the soldering copper holder of this invention, a base in the form of a metallic supporting plate 10 is provided with bent portions such as 11 and 12, the portion 12 serving to engage the non-metallic handle of the copper as shown in Fig. 2, while the portion 11 cooperates with a plate 13 formed with hook members 14 and 15 for securing the holder to a ladder or to serve as standard when the holder is placed on a working bench.

On the metallic plate 10 is mounted a hinge 16 to which the end wall of a metallic tubing 17 is secured, as by an eyelet 19, which also secures to this wall interiorly of tubing 17 a disc 18y of insulating material such as asbestos to serve as a cushion for the working surface of the heat transferring element Ty. On metallic tubing 17 is mounted a sleeve 20 of heat resisting insulating material such as mica and lavite serving as a core for a heater element in the form of a resistance wire 21 coiled at the periphery of sleeve 20 and having a number of turns connected to studs 22, 23, 24 and 25 embedded in a straight row into the insulating sleeve 20 for contacting engagement with a wiper member 26 mounted on one end of a gear rack 27 slidably mounted in a T-shaped groove formed in an insulating strip 28 secured to the under-side of mounting plate 10 as by a plurality of rivets 30 shown in Figs. 1 and 3.

Figure 1:
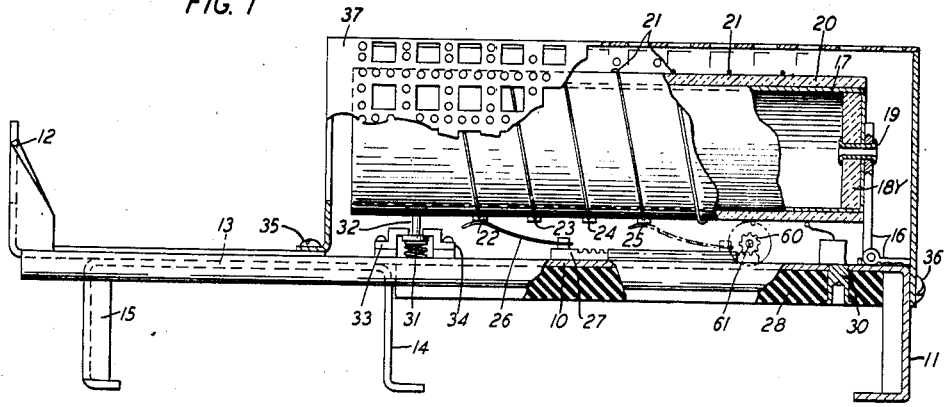
Fig. 1 is a side assembly view, partly in vertical section, shown with the tubular member in normal position.

The tubing 17 is normally held in position shown in Fig. 1 by a spring 31 located in a counter-sunk hole extending through the metallic plate 10 and into the insulating plate 28 with the upper disposed end of this spring bearing against a disc portion formed at the free end of a stud or contact elements 32 anchored into the insulating sleeve 20, this disc simultaneously engaging stop contact elements 33 and 34 insulatedly secured on the mounting plate 10 to serve with these stop elements a bridging contact, the function of which will be hereinafter described in detail and on the mounting plate 10 is secured, as by a number of screws 35 and 36 shown in Figs. 1 and 2, a metallic shell 37 serving as a guard against damage to the resistance wire 21 on the insulating sleeve 20.

Figure 3:
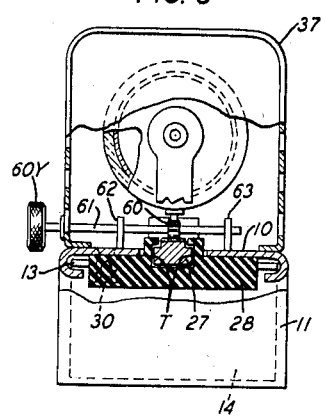
Fig. 3 is a right-hand view, partly in section.

A wiper 26 in the switching mechanism used for controlling the temperature of the soldering copper holder is moved in adjusted position relative to contacts 22, 23, 24 and 25 by the rotation of a knob 60Y for actuating a shaft 61 and thereby a pinion 60 keyed to this shaft; bearings as 62 and 63 which are formed with the mounting plate 10 as shown in Fig. 3 serve for supporting the shaft 61.

Figure 4:
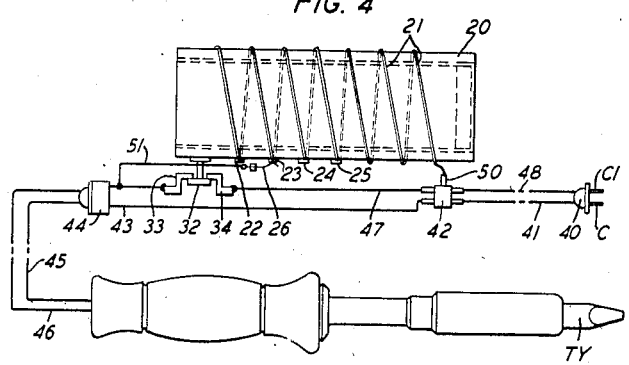
Fig. 4 is a diagrammatic view of the heater element on the tubular member showing the circuit connection of this element with the energizing circuit of the soldering copper.

In the operation of the heater element of the holder of this invention in combination with the heater element of the soldering copper as shown in the diagrammatic view in Fig. 4 one side of the energizing circuit of the soldering copper extends from the terminal C of a plug 40, the wire 41, one side of the block terminal 42, the wire 43, one side of the block terminal 44, the wire 45, the heater element of the copper (not shown), the return wire 46, the other side of block terminal 44, the closed bridge contact elements 32, 33, 34, the wire 47, the other side of block 42, the wire 48 and the terminal C1 of plug 40, the operating temperature of the soldering copper in this circuit being substantially 900° F., while the small amount of current passing through the resistance wire 21 connected to the terminal 50 of block 42 is ineffective to raise the temperature of the holder to any appreciable degree.

Upon the placing of the soldering copper into the tubing 17, the weight of the soldering copper causes the pivotal movement of this tubing on the hinge 16 against the resistance of retractile spring 31 from the position shown in Fig. 1 to the position shown in Fig. 2 for opening the bridge contacts 32, 33, 34 thus causing the current to flow through the resistance wire 21 from the terminal 50, the wiper 26 connected to one of the terminals of plug 44 with its free end engaging with one of the contacts 22, 23, 24 and 25 as the case may be, the current flowing through the resistance wire 21 in this circuit and through the soldering copper element being effective to raise the temperature of the holder so as to maintain the soldering copper at any desired temperature depending upon the adjustment of the wiper 26 relative to contacts 22, 23, 24 and 25, thus preventing the soldering copper from rising to a damaging temperature while maintaining it to a temperature slightly below that required for efficient soldering operations.

What is claimed is:

1. In a holder for an electrically heated tool, an energizing circuit for the tool, a supporting plate, a metallic tubing pivoted at one end to said plate for receiving the electrically heated tool, a sleeve of insulating material mounted on said metallic tubing, a heater element carried by said sleeve connected in shunt to the energizing circuit of the tool, and having contact points, an adjustable wiper for engaging said contact points for controlling the operation of said heater element, a pair of contact elements insulatedly mounted on said plate, a bridge piece carried by said sleeve, a spring disposed between said plate and said bridge piece for engaging said bridge piece with said contact elements simultaneously to close the energizing circuit of the tool and limiting the pivotal movement of said tubing relative to said base upon the removal of the tool therefrom.

2. A holder for an electrically heated soldering copper, an energizing circuit for said soldering copper, said holder comprising a mounting, a metallic tubing hinged at one end to said mounting for receiving the soldering copper, a sleeve of insulating material fitted over said tubing, a heater element coiled on said insulating sleeve and connected in shunt in the operating circuit of said soldering copper, a switching device having a wiper and contacts connected to said heater element, a manually operable mechanism for moving said wiper in selective engagement with said contacts for controlling the temperature of the soldering copper when placed into said tubing, another contact closed by the pivotal movement of said tubing upon the removal of the soldering copper therefrom to close the soldering copper energizing circuit and shunting said heater element and a retractile spring for effecting the pivotal movement of said tubing for closing the last-mentioned contact.

AMOS H. SHANGLE.